(12) United States Patent
Ito (10) Patent No.: US 10,001,642 B2
(45) Date of Patent: Jun. 19, 2018

(54) ELECTRO-OPTICAL DEVICE, METHOD OF MANUFACTURING ELECTRO-OPTICAL DEVICE, AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 181 days.

(21) Appl. No.: 15/171,622

(22) Filed: Jun. 2, 2016

(65) Prior Publication Data

US 2016/0291322 A1    Oct. 6, 2016

Related U.S. Application Data

(62) Division of application No. 15/057,402, filed on Mar. 1, 2016, now Pat. No. 9,709,801.

(30) Foreign Application Priority Data

Apr. 1, 2015 (JP) .................................. 2015-074869

(51) Int. Cl.
*G02B 26/08* (2006.01)

(52) U.S. Cl.
CPC .............................. *G02B 26/0841* (2013.01)

(58) Field of Classification Search
CPC .......................... G02B 26/00; G02B 26/0808; G02B 26/0816; G02B 26/0833; G02B 26/0841; G02B 6/35; G02B 6/351; G02B 6/3512; G02B 6/3518; B81B 2201/04; B81B 2201/042; B81B 2201/047; B81B 2201/045

(Continued)

(56) References Cited

U.S. PATENT DOCUMENTS 5,061,049 A    10/1991    Hornbeck
5,083,857 A *   1/1992    Hornbeck .......... G02B 26/0841
                                                          359/291

(Continued)

FOREIGN PATENT DOCUMENTS

JP    H08-62517 A    3/1996
JP    H08-227042 A   9/1996

(Continued)

OTHER PUBLICATIONS

Jul. 29, 2016 Office Action issued in U.S. Appl. No. 15/057,402.
Jan. 30, 2017 Office Action Issued in U.S. Appl. No. 15/057,402.

*Primary Examiner* — Robert E Tallman
(74) *Attorney, Agent, or Firm* — Oliff PLC (57) ABSTRACT

In an electro-optical device, a torsion hinge and a mirror support post are formed as one piece together with a conductive member, and in the mirror support post, a first end portion on a substrate side is an open end which is opened toward the substrate. In the mirror support post, a second end portion on a mirror side is a flat plate which closes an opening of the mirror support post, and the mirror is in contact with a surface of the flat plate at a side opposite to the substrate. The first sacrificial layer which is used for manufacturing the electro-optical device is formed by exposure, development, and etching in a state in which a hard mask is formed, with respect to the photosensitive resin layer.

6 Claims, 11 Drawing Sheets

(58) Field of Classification Search
USPC ......... 359/196.1, 197.1, 199.1, 199.2, 199.3,
359/199.4, 200, 201.2, 202.1, 203.1,
359/212.1, 212.2, 213.1, 223.1, 224.1,
359/224.2, 225.1
See application file for complete search history.

(56) References Cited

U.S. PATENT DOCUMENTS

| | | | |
|---|---|---|---|
| 5,454,906 A | 10/1995 | Baker et al. | |
| 5,631,782 A * | 5/1997 | Smith | G02B 26/0841 |
| | | | 359/871 |
| 5,703,728 A | 12/1997 | Smith et al. | |
| 7,404,909 B2 * | 7/2008 | Rothenbury | G02B 26/0833 |
| | | | 216/31 |
| 2004/0070813 A1 | 4/2004 | Aubuchon | |
| 2004/0184132 A1 | 9/2004 | Novotny et al. | |
| 2005/0275930 A1 | 12/2005 | Patel et al. | |
| 2007/0188847 A1 * | 8/2007 | McDonald | G02B 26/0833 |
| | | | 359/291 |
| 2008/0220552 A1 | 9/2008 | Pan | |
| 2008/0297874 A1 | 12/2008 | Pan | |

FOREIGN PATENT DOCUMENTS

| | | |
|---|---|---|
| JP | 2007-510174 A | 4/2007 |
| JP | 2009-198700 A | 9/2009 |

* cited by examiner

ELECTRO-OPTICAL DEVICE, METHOD OF MANUFACTURING ELECTRO-OPTICAL DEVICE, AND ELECTRONIC APPARATUS

CROSS-REFERENCE TO RELATED APPLICATIONS

This is a Division of application Ser. No. 15/057,402 filed Mar. 1, 2016, which claims priority to Japanese Patent Application JP 2015-074869, filed Apr. 1, 2015. The disclosures of the prior applications are hereby incorporated by reference herein in their entirety.

BACKGROUND

1. Technical Field

Various embodiments of the present invention relate to an electro-optical device including a mirror, a method of manufacturing the electro-optical device, and an electronic apparatus.

2. Related Art

For example, a projection display device, which modulates light emitted from a light source using a plurality of mirrors (micro mirrors) of an electro-optical device called a digital mirror device (DMD), enlarges the modulated light to project using a projection optical system, thereby displaying an image onto a screen, is known as an electronic apparatus. In the electro-optical device which is used for the electronic apparatus, the mirror is supported by a torsion hinge (twist hinge) through a mirror support post, and is electrically coupled to the torsion hinge. In addition, the torsion hinge is supported by a bias electrode on a substrate side which is formed in the substrate through a hinge support post, and is electrically coupled to the bias electrode on a substrate side. Thus, while a bias voltage is applied to the mirror from the bias electrode on a substrate side, if a drive voltage is applied to an address electrode, it is possible to drive the mirror using an electrostatic force which is generated between the mirror and the address electrode. In manufacturing steps of an electro-optical device having the configuration, a torsion hinge, a mirror, or the like is formed by using a sacrificial layer which is configured by a resin material.

Here, if the mirror support post faces the concave portion at a side opposite to the substrate, a large dent is formed on a surface of the mirror, and thereby reflectance of the surface (reflective surface) of the mirror decreases. Thus, a technology, in which an inorganic material is accumulated to a surface of the mirror support post, the sacrificial layer or the like, the surface is ground, and thereafter the reflective film that forms the mirror is formed, is proposed (refer to JP-T-2007-510174). In addition, a configuration, in which a metal layer is formed on a surface of a columnar sacrificial layer (resin layer) remaining on a torsion hinge when a mirror support post is formed, is proposed (refer to JP-A-8-227042).

However, in the same manner as a configuration described in JP-T-2007-510174, in order to fill a concave portion by accumulating an inorganic material, it is necessary to quite thickly accumulate the inorganic material, and in a case of the inorganic material, grinding speed is delayed. For this reason, there is a problem in which a long processing time is required to grind the inorganic material for removal from a surface of a sacrificial layer or the like.

In addition, in the same manner as a configuration described in JP-A-8-227042, if a mirror support post is formed by laminating a metal layer on a columnar resin layer, when the temperature of the electro-optical device is increased due to the light which is incident, or heat which is generated in the substrate at the time of operating a drive circuit, or the like, there is a possibility that gas is generated from the sacrificial layer. If the gas is attached to a surface (reflective surface) of the mirror, reflectance of the mirror is decreased, and thus the gas is not desired. In addition, in order to form a torsion hinge (twist hinge) and a mirror support post, steps of forming a metal layer with two layers and forming an intermediate layer with an insulating property between the metal layers of two layers for patterning are required, and thus a manufacturing step of the electro-optical device is complicated.

SUMMARY

An advantage of some aspects of the invention is to provide an electro-optical device which can efficiently form a mirror without a sacrificial layer remaining on a support post which supports a mirror and without a large dent on a surface of the mirror, a method of manufacturing the electro-optical device, and an electronic apparatus.

According to an aspect of the invention, an electro-optical device includes a substrate; a first support post (hinge support post) which protrudes toward the substrate at one surface side of the substrate and is supported by the substrate; a conductive member that includes a torsion hinge (twist hinge) which is supported by the substrate side through the first support post, and a cylindrical second support post (mirror support post), which protrudes toward a side opposite to the substrate from the torsion hinge (twist hinge), in which a first end portion at a side of the torsion hinge is an open end facing the substrate, and which is formed as one piece together with the torsion hinge (twist hinge); and a mirror is in contact with a second end portion of the second support post at a side opposite to the substrate.

According to another aspect of the invention, there is provided a method of manufacturing an electro-optical device including exposing and developing a photosensitive resin layer that is formed at one surface side of a substrate, etching the photosensitive resin layer in a state in which a hard mask that is configured by an inorganic material is formed, and forming a first sacrificial layer that includes a first opening (opening for a hinge support post) and a columnar convex portion protruding toward a side opposite to the substrate; forming a first conductive film on a side of the first sacrificial layer opposite to the substrate and on an internal side of the first opening; patterning the first conductive film, and forming a first support post (hinge support post) that is configured by the first conductive film formed on an internal side of the first opening, a torsion hinge (twist hinge) that is formed as one piece together with the first support post, and a cylindrical second support post that protrudes toward a side opposite to the substrate from the torsion hinge (twist hinge) and is formed as one piece together with the torsion hinge (twist hinge); forming a second sacrificial layer on the torsion hinge (twist hinge) and a side of the second support post opposite to the substrate; planarizing the second sacrificial layer from a side opposite to the substrate to expose the second support post; forming a second conductive film on a side of the second sacrificial layer opposite to the substrate; forming a mirror by patterning the second conductive film; and removing the first sacrificial layer and the second sacrificial layer.

In one or more embodiments of the invention, the second support post (mirror support post) which protrudes toward a side opposite to the substrate from the twist hinge (torsion hinge) is cylindrical, and the first end portion of the substrate side is an open end. For this reason, even though there is a sacrificial layer in the internal side at the time of forming the second support post, the sacrificial layer can be removed. Thus, in the inside of the second support post, the resin configuring the sacrificial layer does not remain. Accordingly, even if the temperature of the electro-optical device increases due to the light which is incident, or heat or the like which is generated in the substrate at the time of operating a drive circuit, gas is not generated from the sacrificial layer. Therefore, a situation in which reflectance of a surface (reflective surface) of the mirror is decreased due to gas which is generated from the sacrificial layer, does not occur. In addition, in a state in which the second end portion is a flat plate in the second support post at a side opposite to the substrate, the mirror separated from the second support post can be coupled to the second support post. For this reason, a dent is not formed on the surface of the mirror. Thus, it is possible to increase utilization efficiency of light, and to prevent contrast from lowering due to scattering at the mirror. In addition, unlike a case in which the concave portion is filled with the inorganic material, it is not necessary to remove a thick inorganic material which fills the concave portion from the mirror, and thus it is possible to efficiently form the mirror support post which does not form a dent on the surface of the mirror. In addition, the second support post which protrudes from the torsion hinge (twist hinge) toward a side opposite to the substrate is a cylindrical, the first end portion on the substrate side becomes the open end, and a second support post is formed as one piece together with the torsion hinge (twist hinge). For this reason, it is possible to prevent strength which is generated in a boundary section between the second support post and the torsion hinge (twist hinge) from decreasing, and the reliability of the electro-optical device increases.

In one or more embodiments of the invention, it is preferable that the second end portion is a flat plate which closes an opening of the second support post. According to the configuration, it is possible to couple the second support post to the mirror reliably and electrically.

In one or more embodiments of the invention, it is preferable that a curved sectional shape is formed between the second support post and the torsion hinge (twist hinge). According to the configuration, there is an advantage in which stress being applied to the torsion hinge (twist hinge) from the mirror through the second support post is hardly concentrated on a specific position.

In one or more embodiments of the invention, it is preferable that an outer peripheral surface of the second support post is a tapered surface facing the mirror side. According to the configuration, it is possible to increase the strength of the second support post.

The method of manufacturing the electro-optical device according to one or more embodiments of the invention may employ an aspect in which, in the forming of the first sacrificial layer, the photosensitive resin layer is exposed and developed to be partially thin to form the convex portion, and the photosensitive resin layer is etched to form the first opening.

In this case, it is preferable that, in the exposing and developing, exposing is performed using a half tone mask.

The method of manufacturing the electro-optical device according to one or more embodiments of the invention may employ an aspect in which, in the forming of the first sacrificial layer, the photosensitive resin layer is exposed and developed to form the first opening, and thereafter the photosensitive resin layer is etched to partially thin the photosensitive resist, and thereby the convex portion is formed.

The method of manufacturing the electro-optical device according to one or more embodiments of the invention may employ an aspect in which a positive-type photosensitive resin layer is formed as the photosensitive resin layer. In addition, the method of manufacturing the electro-optical device according to the one or more embodiments of invention may employ an aspect in which a negative-type photosensitive resin layer is formed as the photosensitive resin layer.

An electro-optical device which employs one or more embodiments of the invention can be used for various types of electronic apparatuses, and in this case, a light source unit which emits light source light to the mirror is provided in the electronic apparatus. In addition, if a projection type display device or a head-mounted display device is configured as the electronic apparatus, a projection optical system which projects the light modulated by the mirror is further provided in the electronic apparatus.

BRIEF DESCRIPTION OF THE DRAWINGS

Various embodiments of the invention will be described with reference to the accompanying drawings, wherein like numbers reference like elements.

DESCRIPTION OF EXEMPLARY EMBODIMENTS

Embodiments of the invention will be described with reference to the drawings. In the following description, a projection type display device serving as an electronic apparatus which employs one or more embodiments of the invention will be described. In addition, in the figures referred to by the following description, each layer and each member is illustrated in a recognizable size in the figures, and scales are different from each other for each layer and each member. In addition, the number of mirrors or the like is reductively illustrated in the drawings.

Projection Type Display Device Serving as Electronic Apparatus

Figure 1:
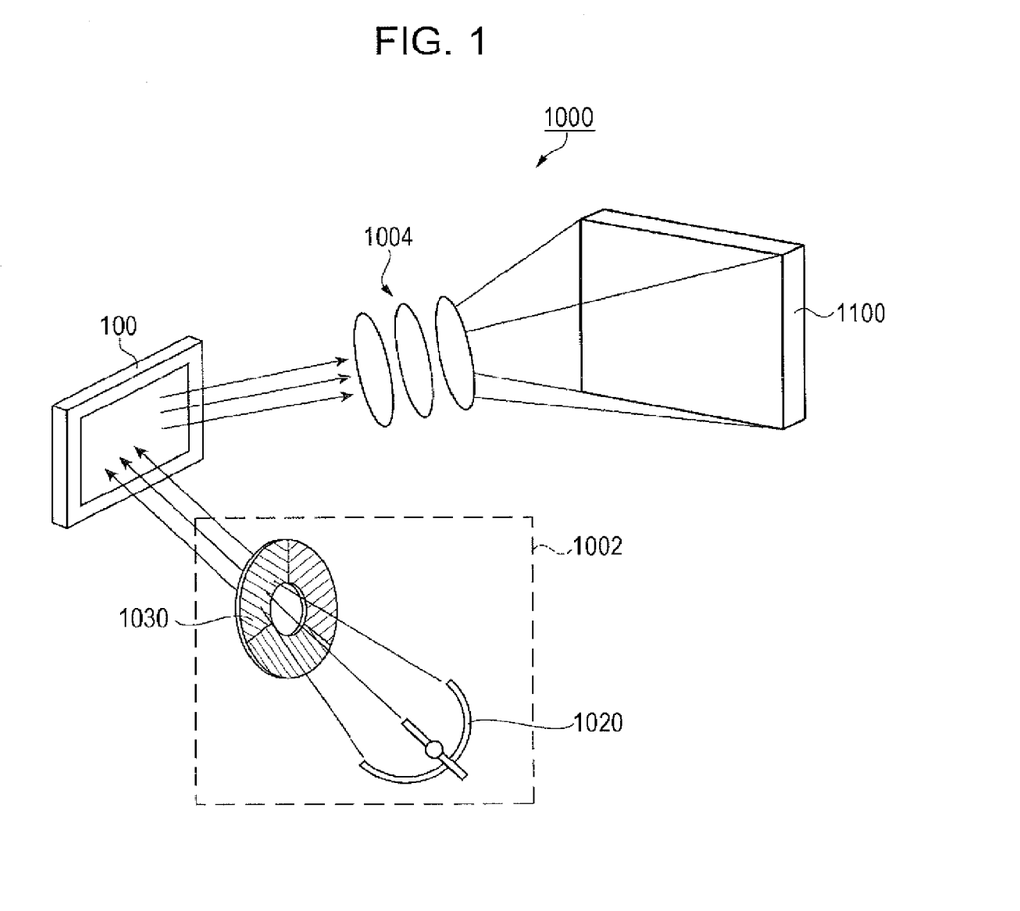
FIG. 1 is a schematic view illustrating an optical system of a projection type display device serving as an electronic apparatus which employs an embodiment of the invention.

FIG. 1 is a schematic view illustrating an optical system of a projection type display device serving as an electronic apparatus which employs an embodiment of the invention. The projection type display device 1000 illustrated in FIG. 1 includes a light source unit 1002, an electro-optical device 100 which modulates light emitted from the light source unit 1002 in response to image information, and a projection optical system 1004 which projects the light modulated by the electro-optical device 100 onto an image-projected body 1100 such as a screen as a projection image. The light source unit 1002 includes a light source 1020 and a color filter 1030. The light source 1020 emits white light, the color filter 1030 emits lights of various colors in accordance with rotation, and the electro-optical device 100 modulates the incident light at a timing synchronous to the rotation of the color filter 1030. Instead of the color filter 1030, a phosphor substrate, which converts the light emitted from the light source 1020 into lights of various colors, may be used. In addition, the light source unit 1002 and the electro-optical device 100 may be provided for each light of various colors.

Basic Configuration of Electro-Optical Device 100

Figure 2A:
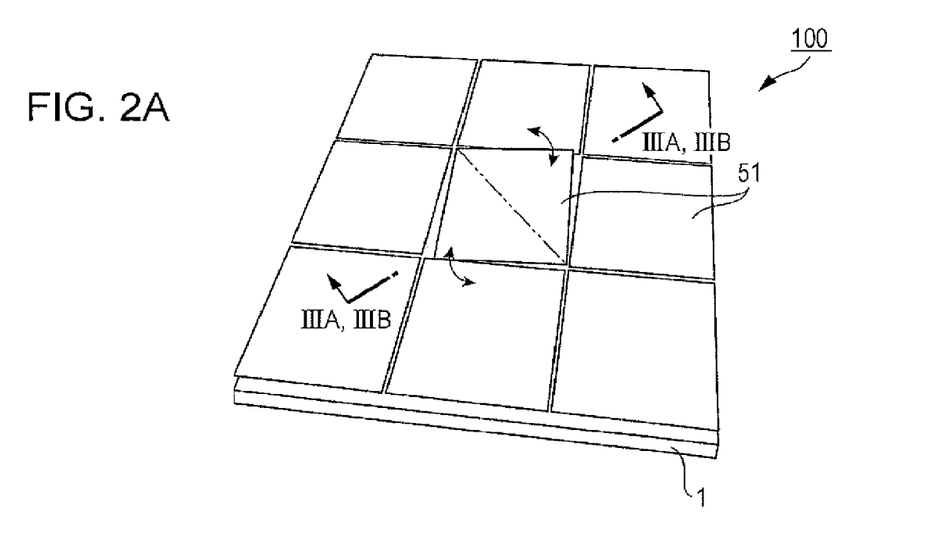
FIGS. 2A and 2B are explanatory views schematically illustrating a basic configuration of an electro-optical device which employs an embodiment of the invention.
Figure 2B:
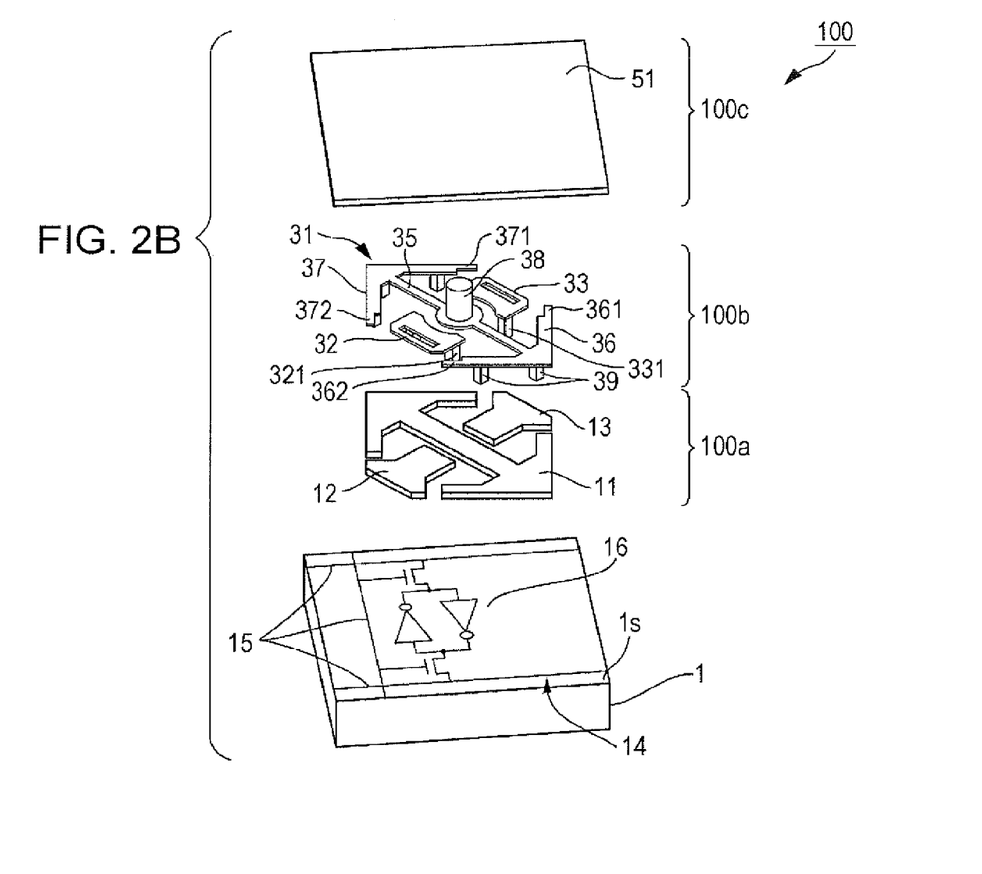
Figure 3A:
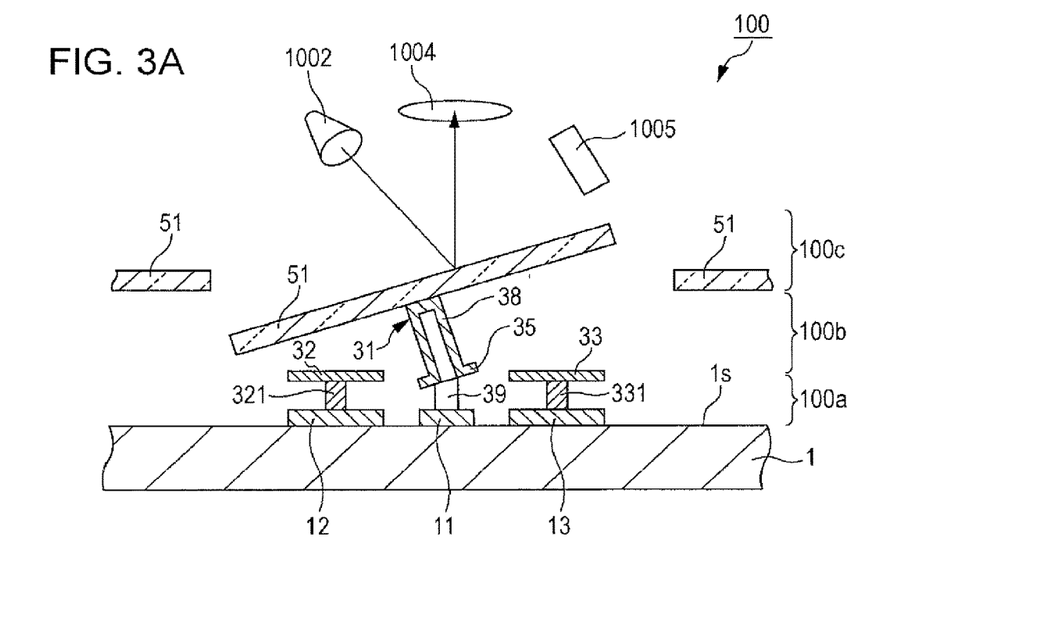
FIGS. 3A and 3B are explanatory views schematically illustrating a cross portion IIIA-IIIA and IIIB-IIIB of a principal portion of the electro-optical device which employs an embodiment of the invention.
Figure 3B:
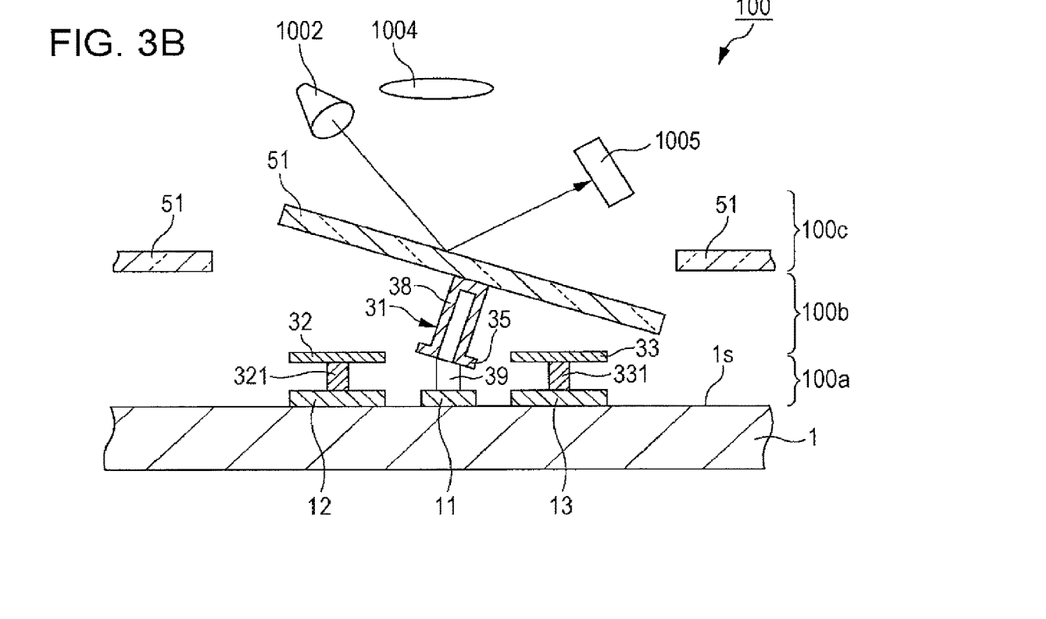

FIGS. 2A and 2B explanatory views schematically illustrating a basic configuration of the electro-optical device 100 which employs an embodiment of the invention, and FIGS. 2A and 2B are respectively an explanatory view illustrating a principal portion of the electro-optical device 100 and an exploded perspective view of a principal portion of the electro-optical device 100. FIGS. 3A and 3B are explanatory views schematically illustrating a cross portion IIIA-IIIA and IIIB-IIIB of the principal portion of the electro-optical device 100 which employs an embodiment of the invention, and FIGS. 3A and 3B are respectively an explanatory view schematically illustrating a state in which a mirror is tilted to one side, and an explanatory view schematically illustrating a state in which the mirror is tilted to the other side.

As illustrated in FIGS. 2A and 2B and FIGS. 3A and 3B, in the electro-optical device 100, a plurality of mirrors 51 are disposed over one surface is of a substrate 1 in a matrix, and the mirrors 51 are separated from the substrate 1. The substrate 1 is, for example, a silicon substrate. For example, each of the mirrors 51 is a micro mirror having a plane size in which a length of one side thereof is, for example, 10 μm to 30 μm. The mirrors 51 are arranged with a size of, for example, 600×800 to 1920×1080, and one mirror 51 corresponds to one pixel of an image.

A surface of the mirror 51 is configured by a reflective surface which is formed of a reflective metal film such as aluminum. The electro-optical device 100 includes a first portion 100a having a bias electrode 11 on the substrate side which is formed on one surface is of the substrate 1, and address electrodes 12 and 13 on the substrate side, a second portion 100b having upper address electrodes 32 and 33 and a torsion hinge (twist hinge) 35, and a third portion 100c having the mirrors 51. An address circuit 14 is formed on the substrate 1 in the first portion 100a. The address circuit 14 includes a memory cell for selectively controlling an operation of each mirror 51, lines 15 such as a word line and a bit line, or the like. A random access memory (RAM) having a CMOS circuit 16 includes a circuit configuration similar thereto.

The second portion 100b includes the upper address electrodes 32 and 33, the torsion hinge 35, and a mirror support post (second support post) 38. The upper address electrodes 32 and 33 are electrically coupled to the address electrodes 12 and 13 on the substrate side through electrode posts 321 and 331, and are supported by the address electrodes 12 and 13 on the substrate side. Hinge arms 36 and 37 extend from both ends of the torsion hinge 35. The hinge arms 36 and 37 are electrically coupled to the bias electrode 11 on the substrate side through a hinge support post (first support post) 39, and are supported by the bias electrode 11 on the substrate side. The mirrors 51 are electrically coupled to the torsion hinge 35 through the mirror support post 38, and are supported by the torsion hinge 35. Thus, the mirrors 51 are electrically coupled to the bias electrode 11 on the substrate side through the mirror support post 38, the torsion hinge 35, the hinge arms 36 and 37, and the hinge support post 39, and receives a bias voltage which is applied from the bias electrode 11 on the substrate side. Stoppers 361, 362, 371, and 372, which come into contact with the mirrors 51 when the mirrors 51 tilt and prevent the mirrors 51 from coming into contact with the upper address electrodes 32 and 33, are formed in tips of the hinge arms 36 and 37.

A drive element, which drives the mirrors 51 to tilt by generating an electrostatic force, is configured between the address electrodes 12 and 13 on the substrates side and the upper address electrodes 32 and 33, and the mirrors 51. Specifically, as illustrated in FIGS. 3A and 3B, a drive voltage is applied to the address electrodes 12 and 13 on the substrates side and the upper address electrodes 32 and 33, and thereby when the mirrors 51 tilt toward the address electrode 12 and the upper address electrode 32, or the address electrode 13 and the upper address electrode 33, the torsion hinge 35 is twisted. Thus, when application of the drive voltage to the address electrodes 12 and 13 on the substrates side and the upper address electrodes 32 and 33 is stopped and thereby pulling force for the mirrors 51 is lost, the mirrors 51 exert a force for returning to a posture parallel to the substrate 1.

For example, if the mirror 51 tilts toward the address electrode 12 on the substrate side and the upper address electrode 32 as illustrated in FIG. 3A, the electro-optical device 100 enters an ON state in which the light emitted from the light source unit 1002 is reflected toward the projection optical system 1004 by the mirror 51. In contrast to this, if the mirror 51 tilts toward the address electrode 13 on the substrate side and the upper address electrode 33 as illustrated in FIG. 3B, the electro-optical device 100 enters an OFF state in which the light emitted from the light source unit 1002 is reflected toward a light absorption device 1005 by the mirror 51. In the OFF state, the light is not reflected toward the projection optical system 1004. The driving is performed by each of the plurality of mirrors 51, and as the result, the light emitted from the light source unit 1002 is modulated into image light by the plurality of mirrors 51, is projected from the projection optical system 1004, and thereby the image is displayed.

A yoke of a flat plate shape facing the address electrodes 12 and 13 on the substrate side is provided as one piece with the torsion hinge 35, and the mirror 51 can also be driven by using an electrostatic force which operates between the address electrodes 12 and 13 on the substrate side and the yoke, in addition to a electrostatic force which is generated between the upper address electrodes 32 and 33 and the mirror 51.

Detailed Configuration of Electro-Optical Device 100

Figure 4:
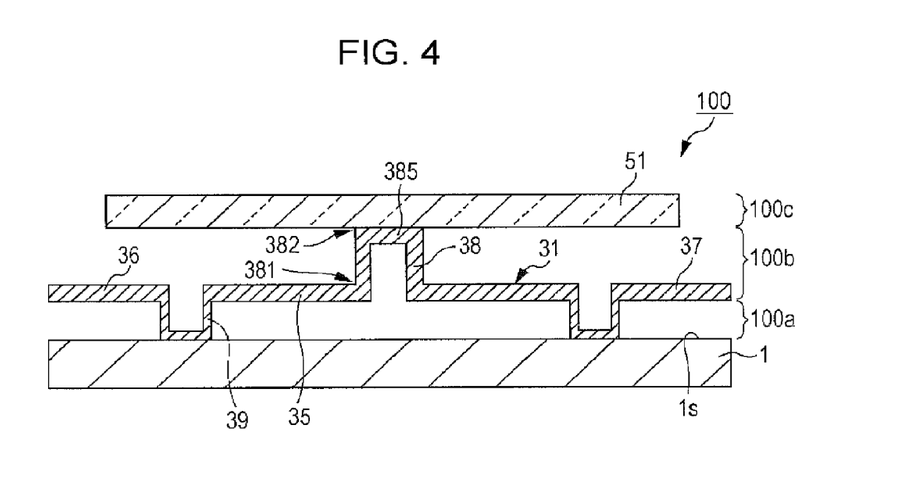
FIG. 4 is a cross-sectional view illustrating a specific configuration of the electro-optical device which employs an embodiment of the invention.

FIG. 4 is a cross-sectional view illustrating a detailed configuration of the electro-optical device 100 which employs an embodiment of the invention. FIG. 4 illustrates only the second portion 100b and the third portion 100c of the electro-optical device 100. Illustrating of the first portion 100a which includes the bias electrode 11 on the substrate side and the address electrodes 12 and 13 on the substrate side is omitted. In addition, FIG. 4 illustrates only the mirror support post (second support post) 38 and the torsion hinge (twist hinge) 35 for one mirror 51 among the plurality of mirrors 51 which are formed in the electro-optical device 100.

As illustrated in FIG. 4, the electro-optical device 100 includes the torsion hinge 35 with conductivity supported by the substrate 1 side through the hinge support post (first support post) 39 with conductivity on the one surface is of the substrate 1. In addition, the electro-optical device 100 includes the cylindrical mirror support post 38 which protrudes toward a side opposite to the substrate 1 side from the torsion hinge 35 in a central portion in a length direction of the torsion hinge 35, and the mirror 51 which is supported by the mirror support post 38.

Here, the torsion hinge 35 and the mirror support post 38 are formed as one piece. More specifically, in a conductive member 31 which includes the torsion hinge 35 and the mirror support post 38 that are formed as one piece, the torsion hinge 35 is configured by a section which extends along the one surface is of the substrate 1, and the mirror support post 38 is configured by a section which protrudes toward a side opposite to the substrate 1 side. In addition, the hinge support post 39 is also formed as one piece together with the conductive member 31. That is, in the conductive member 31, the hinge support post 39 is configured by a section which protrudes toward the substrate 1 from the torsion hinge 35, and the hinge support post 39 is supported by the substrate 1.

In the mirror support post 38, a first end portion 381 of the substrate 1 side (torsion hinge 35 side) becomes an opened end which is opened toward the substrate 1. In the mirror support post 38, a second end portion 382 at a side (the mirror 51 side) opposite to the substrate 1 and the torsion hinge 35 becomes a flat plate 385 for closing an opening of the mirror support post 38, and the mirror 51 is in contact with a surface of the flat plate 385 opposite to the substrate 1. For this reason, a dent does not exist on the surface of the mirror 51.

Method of Manufacturing Electro-Optical Device

Steps of forming the torsion hinge (twist hinge), the mirror support post (second support post), and the mirror among the steps of manufacturing the electro-optical device 100 which employs an embodiment of the invention will be mainly described with reference to FIG. 2B and FIGS. 5A to 8F. FIGS. 5A to 5E, FIGS. 6A to 6C, and FIGS. 7A to 7D are step sectional views illustrating a method of manufacturing the electro-optical device 100 which employs an embodiment of the invention. FIGS. 8A to 8F are plan views of layers formed through the manufacturing steps of the electro-optical device 100 which employs an embodiment of the invention. FIG. 5A to 8F illustrate only the mirror support post 38 and the torsion hinge (twist hinge) 35 for one mirror 51 among the plurality of mirrors 51 formed in the electro-optical device 100. In addition, in the following description, a relationship between the respective sections described with reference to FIG. 2B will also be appropriately described.

Figure 5A:
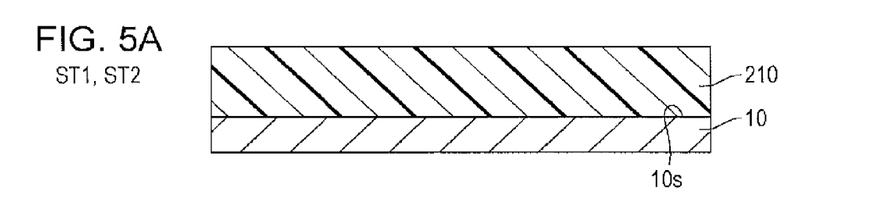
FIGS. 5A to 5E are step sectional views illustrating a manufacturing method of the electro-optical device which employs an embodiment of the invention.

At the beginning, as illustrated in FIG. 5A, in step ST1, the address circuit 14, the bias electrode 11 on the substrate side, the address electrodes 12 and 13 on the substrate side, and the like which are described with reference to FIG. 2B are formed in the wafer 10 which is configured by a silicon substrate.

Subsequently, in step ST2, a photosensitive resin layer 210 which is configured by a positive-type organic photoresist or the like is formed on one surface 10s of the wafer 10. Subsequently, in step ST3 (exposure and development processing) illustrated in FIG. 5B, exposure and development is performed for the photosensitive resin layer 210, and thereby the photosensitive resin layer 210 is partially thin, and a columnar convex portion 212 which protrudes toward a side opposite to the substrate 1 is formed (refer to FIG. 8A). A thickness of the photosensitive resin layer 210 is, for example, 3 μm, and an outer diameter of the convex portion 212 is, for example, approximately 0.6 μm. In the exposure and development processing, the photosensitive resin layer 210 is exposed by using a half tone mask. For this reason, the photosensitive resin layer 210 can be thinned easily and partially, and thus the thinned portion can have a proper thickness.

Figure 5B:
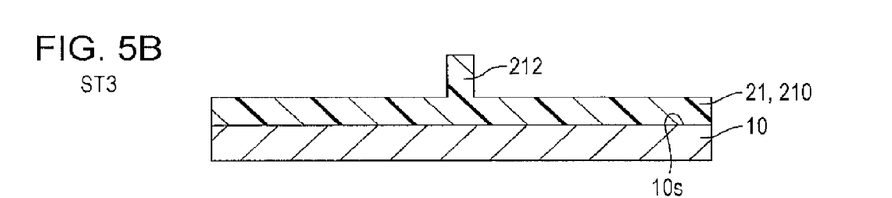
Figure 5C:
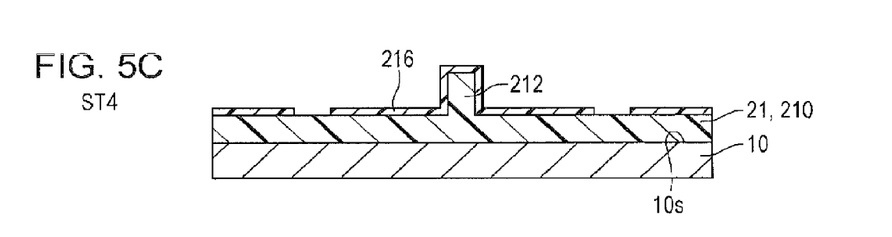
Figure 5D:
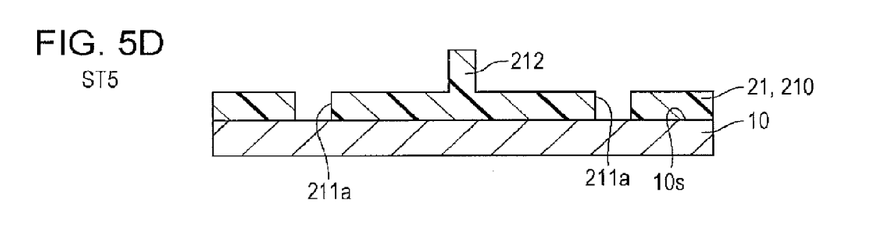
Figure 8A:
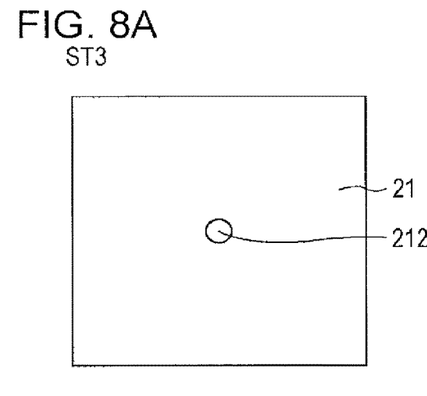
FIGS. 8A to 8F are plan views of layers formed by manufacturing steps of the electro-optical device which employs an embodiment of the invention.
Figure 8B:
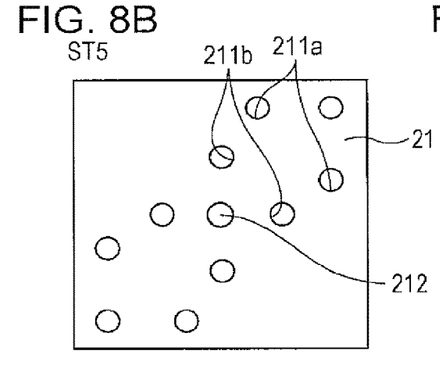

Subsequently, in an etching processing step, in step ST4 (hard mask forming step) illustrated in FIG. 5C, a hard mask 216 which is configured by an inorganic material such as silicon oxide (SiO$_2$) on a surface of the photosensitive resin layer 210 at a side opposite to the substrate 1 is formed. More specifically, after an inorganic film such as a silicon oxide film (SiO$_2$) is formed through a PEVCD method or the like, the inorganic film is patterned in a state in which a resist mask is formed on a surface (surface at a side opposite to the wafer 10) of the inorganic film, and thereby the hard mask 216 is formed. Subsequently, in step ST5 illustrated in FIG. 5D, the photosensitive resin layer 210 is etched, the opening (first opening) 211a for a hinge support post is formed in a position corresponding to an opening of the hard mask 216, and thereafter, the hard mask 216 is removed. At this time, as illustrated in FIG. 8B, the opening 211b for an electronic post is also formed for the electrode posts 321 and 331 of the upper address electrodes 32 and 33. A diameter of the opening 211a for a hinge support post is, for example, approximately 0.6 μm.

The steps ST2, ST3, ST4, and ST5 are a first sacrificial layer forming step through which a the first sacrificial layer 21 that includes the opening 211a for a hinge support post and the columnar convex portion 212 is formed through the exposure and development processing and the etching processing.

Figure 5E:
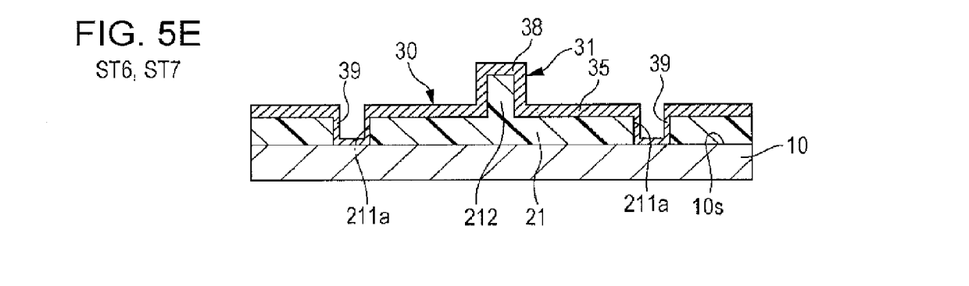

Subsequently, in step ST6 (first conductive film forming step) illustrated in FIG. 5E, a first conductive film 30 is formed on an entire surface (surface at a side opposite to the wafer 10) of the first sacrificial layer 21. At this time, the first conductive film is also formed on a wall surface and a bottom surface of the opening 211a for a hinge support post. The first conductive film 30 is, for example, a single film of an aluminum layer or a laminated film of an aluminum layer and a titanium layer, and a thickness thereof is, for example, 0.06 μm.

Figure 8C:
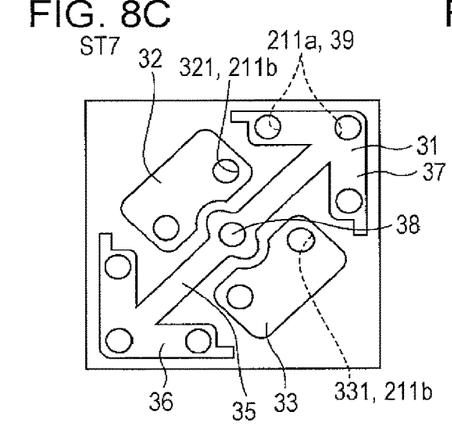

Subsequently, in step ST7 (first patterning step), the first conductive film 30 is patterned in a state in which a resist mask is formed on a surface (surface at a side opposite to the wafer 10) of the first conductive film 30, and thereby a conductive member 31 which includes the torsion hinge 35 is formed. At this time, in the conductive member 31, the hinge support post 39 is formed as one piece together with the torsion hinge 35 by the first conductive film 30 remaining in the opening 211a for a hinge support post. In addition, in the conductive member 31, the cylindrical mirror support post 38 which protrudes toward a side opposite to the substrate 1 from the torsion hinge 35 is formed as one piece together with the torsion hinge 35. At this time, as illustrated in FIG. 8C, the hinge arms 36 and 37 are formed in the conductive member 31. In addition, the upper address electrodes 32 and 33 are simultaneously formed, and the electrode posts 321 and 331 are formed in the inside of the opening 211b for an electrode post.

Figure 6A:
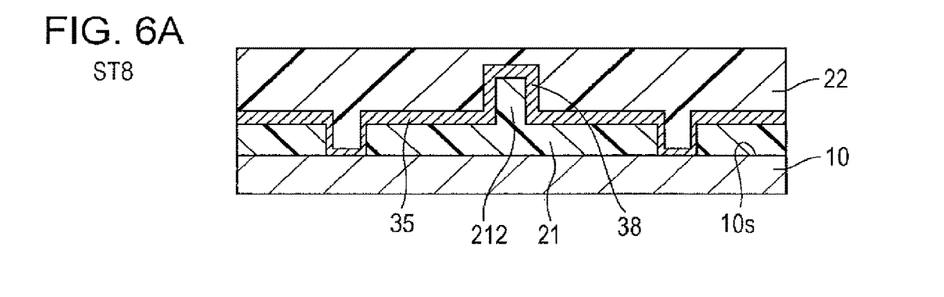
FIGS. 6A to 6C are step sectional views illustrating a manufacturing method of the electro-optical device which employs an embodiment of the invention.

Subsequently, in step ST8 (second sacrificial layer forming step) illustrated in FIG. 6A, after a photosensitive resin layer which is configured by a positive-type inorganic photoresist or the like is formed such that the torsion hinge 35 and the mirror support post 38 are covered from a side opposite to the wafer 10, and the photosensitive resin layer is cured, and thereby a second sacrificial layer 22 is formed. A thickness of the second sacrificial layer 22 is, for example, 3 μm.

Figure 6B:
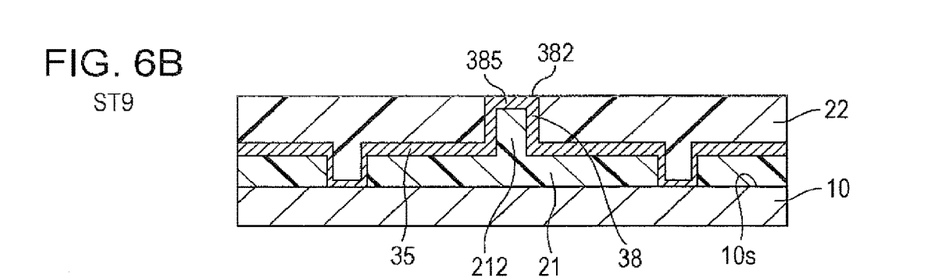
Figure 8D:
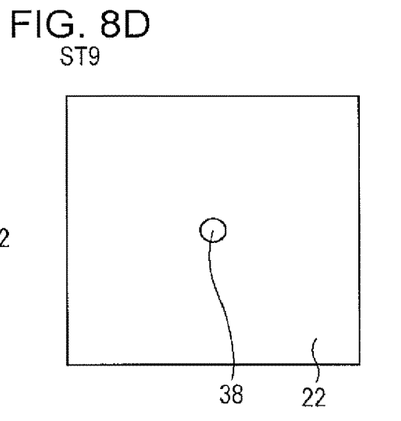

Subsequently, in step ST9 (planarization step) illustrated in FIG. 6B, the second sacrificial layer 22 is planarized from a side opposite to the wafer 10 through a CMP method or the like, and thereby the second end portion 382 of the mirror support post 38 is exposed (refer to FIG. 8D). In the present embodiment, the planarization is performed such that the flat plate 385 remains in the second end portion 382 of the mirror support post 38.

Figure 6C:
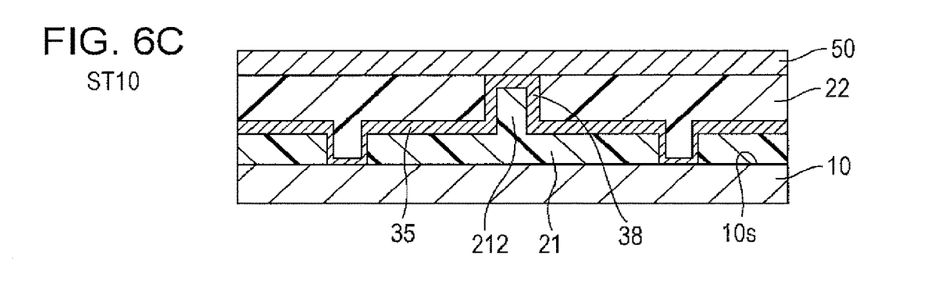

Subsequently, in step ST10 (second conductive film forming step) illustrated in FIG. 6C, a second conductive film 50 is formed on a surface of the second sacrificial layer 22 at a side opposite to the wafer 10. The second conductive film 50 is an aluminum layer with a thickness of, for example, 0.3 μm.

Figure 7A:
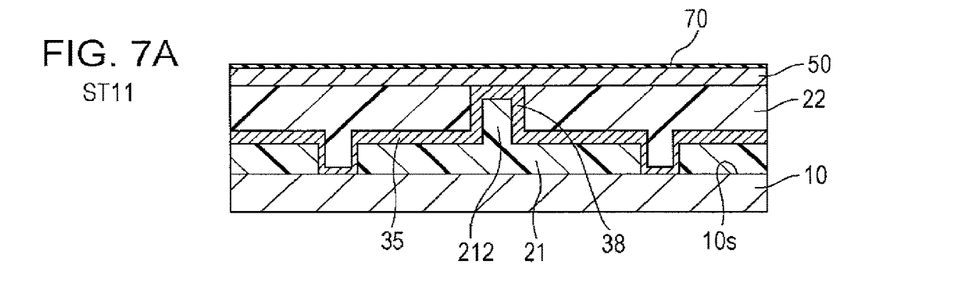
FIGS. 7A to 7D are step sectional views illustrating a manufacturing method of the electro-optical device which employs an embodiment of the invention.
Figure 7B:
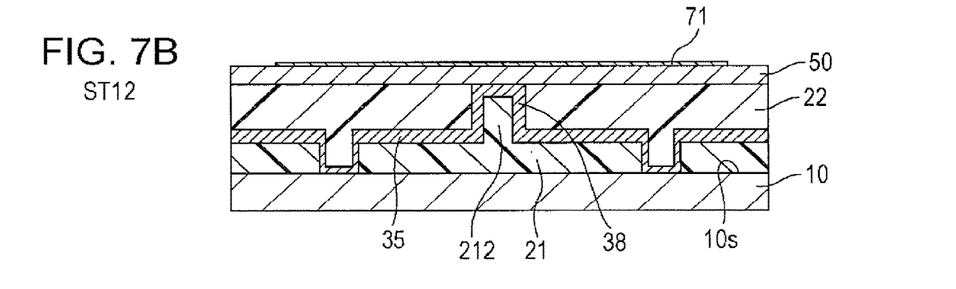
Figure 7C:
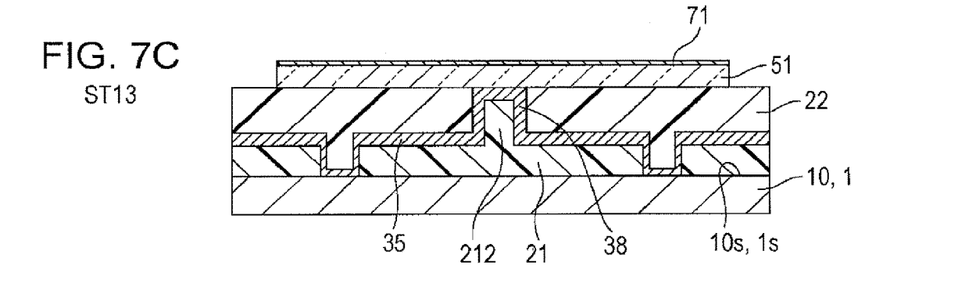
Figure 8E:
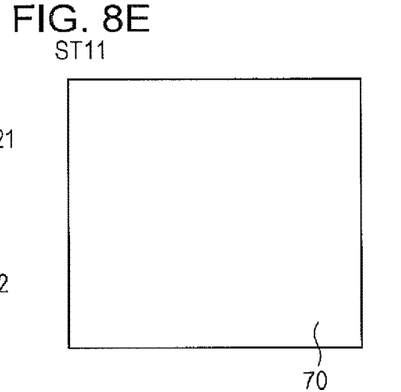
Figure 8F:
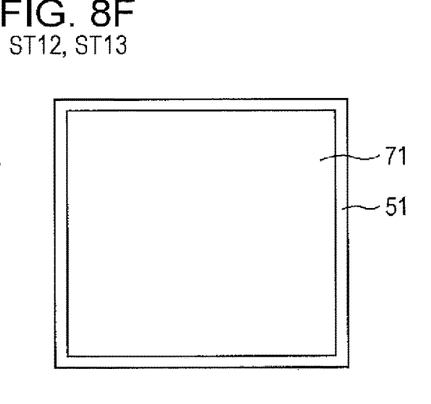

Subsequently, in step ST11 illustrated in FIG. 7A, an inorganic film 70 such as a silicon oxide film ($SiO_2$) is formed through a PECVD method or the like (refer to FIG. 8E). Subsequently, in step ST12 illustrated in FIG. 7B, the inorganic film 70 is patterned in a state in which a resist mask is formed on a surface (surface at a side opposite to the wafer 10) of the inorganic film 70, and thereby an etching stopper layer 71 having the same plan shape as the mirror 51 is formed (refer to FIG. 8F). Thereafter, the resist mask is removed. Subsequently, in step ST13 illustrated in FIG. 7C, the second conductive film 50 is patterned by using the etching stopper layer 71 as a mask, and thereby the mirror 51 is formed. The steps ST11, ST12, and ST13 make a second patterning step.

Subsequently, the wafer 10 is divided into a plurality of substrates 1, each having a size of a single piece.

Figure 7D:
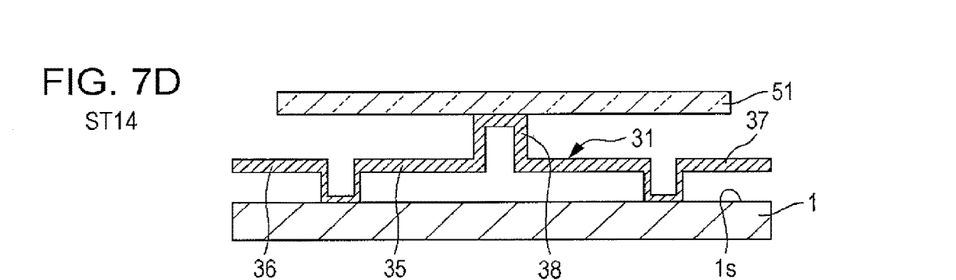

Subsequently, in step ST14 (sacrificial layer removing step) illustrated in FIG. 7D, the first sacrificial layer 21 and the second sacrificial layer 22 are removed by performing plasma etching or the like. At this time, the mirror support post 38 is opened toward the substrate 1, and thus the first sacrificial layer 21 can be removed also from the internal side of the mirror support post 38. In addition, in the present embodiment, when the first sacrificial layer 21 and the second sacrificial layer 22 are removed, the etching stopper layer 71 is removed. As a result, the electro-optical device 100 is obtained.

Main Effects of the Present Embodiment

As described above, in the present embodiment, the mirror support post (second support post) 38 which protrudes toward a side opposite to the substrate 1 from the torsion hinge (twist hinge) 35 is cylindrical, and the first end portion 381 on the substrate 1 side is an open end. For this reason, even though there is the convex portion 212 (the first sacrificial layer 21) on an internal side at the time of forming the mirror support post 38, the first sacrificial layer 21 can be removed. Thus, the resin configuring the sacrificial layer does not remain in the inside of the mirror support post 38. Accordingly, even if the temperature of the electro-optical device 100 increases due to the light which is incident, or heat or the like which is generated in the substrate at the time of operating a drive circuit, gas is not generated from the sacrificial layer. Therefore, a situation in which reflectance of a surface (reflective surface) of the mirror 51 is decreased due to gas which is generated from the sacrificial layer, does not occur. Furthermore, the mirror support post 38 which protrudes from the torsion hinge 35 toward a side opposite to the substrate is a cylindrical and is formed as one piece together with the torsion hinge 35. For this reason, strength which is generated in a boundary section between the mirror support post 38 and the torsion hinge 35, is not decreased.

In addition, in a state in which the second end portion 382 is a flat plate at a side opposite to the substrate 1 in the mirror support post 38, the mirror 51 separated from the mirror support post 38 can be coupled to the mirror support post 38. For this reason, a dent is not formed on the surface of the mirror 51. Thus, it is possible to increase utilization efficiency of light, and to prevent contrast from lowering due to scattering at the mirror 51.

In addition, unlike a case in which the concave portion is filled with the inorganic material, it is not necessary to remove a thick inorganic material which fills the concave portion from the surface of the mirror 51, and thus it is possible to efficiently form the mirror support post 38 which does not form a dent on the surface of the mirror 51.

Another Method of Manufacturing First Sacrificial Layer 21

FIGS. 9A to 9D are step sectional views illustrating another method of manufacturing the first sacrificial layer which is used in manufacturing steps of the electro-optical device 100 which employs an embodiment of the invention. FIGS. 10A and 10B are plan views illustrating a state in which the opening (first opening) 211a for a hinge support post or the like is formed through the method illustrated in FIGS. 9A to 9D.

Figure 9A:
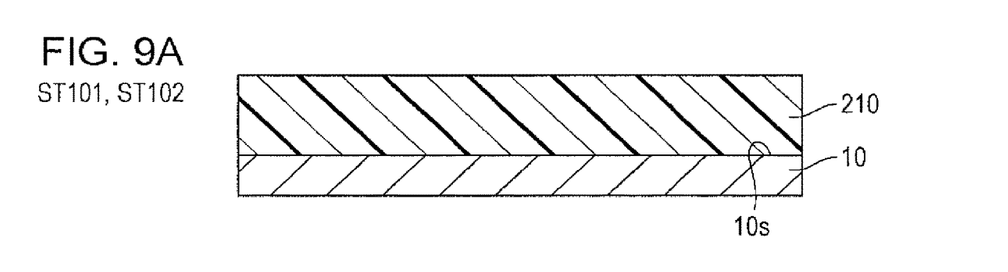
FIGS. 9A to 9D are step sectional views illustrating another method of manufacturing a first sacrificial layer which is used in manufacturing steps of the electro-optical device which employs an embodiment of the invention.
Figure 9B:
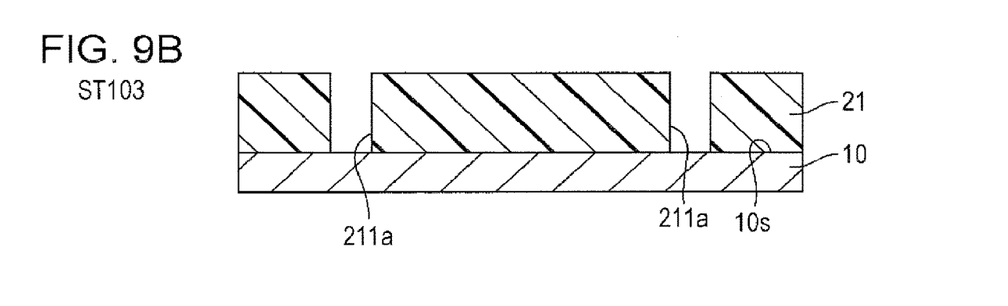
Figure 10A:
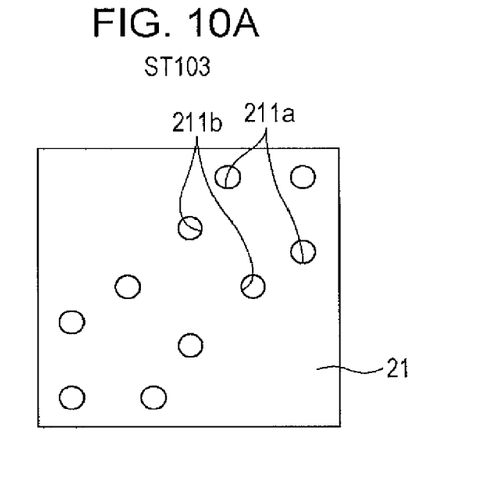
FIGS. 10A and 10B are plan views illustrating a state in which an opening (first opening) for a hinge support post or the like is formed through the method illustrated in FIGS. 9A to 9D.
Figure 10B:
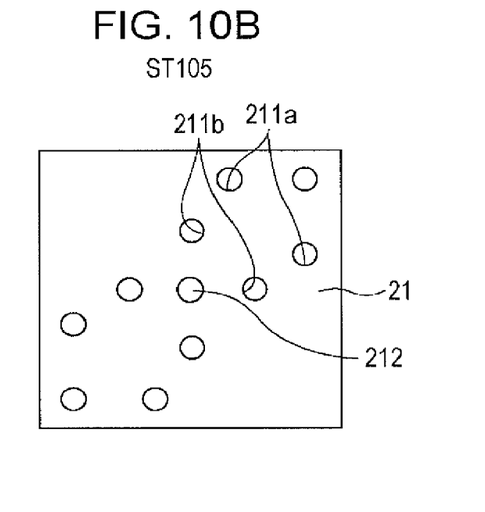

In the present embodiment, in a first sacrificial layer forming step, first, in step ST101, the address circuit 14, the bias electrode 11 on the substrate side, the address electrodes 12 and 13 on the substrate side, and the like which are descried with reference to FIG. 2B are formed in the wafer 10 which is configured by a silicon substrate, as illustrated in FIG. 9A.

Subsequently, in step ST101, the photosensitive resin layer 210 which is configured by a positive-type organic photoresist or the like is formed on the one surface 10s of the wafer 10. Subsequently, in step ST103 (exposure and development processing) illustrated in FIG. 9B, exposure and development are performed for the photosensitive resin layer 210, and the opening (first opening) 211a for a hinge support post and the opening 211b for an electrode post are formed (refer to FIG. 10A).

Figure 9C:
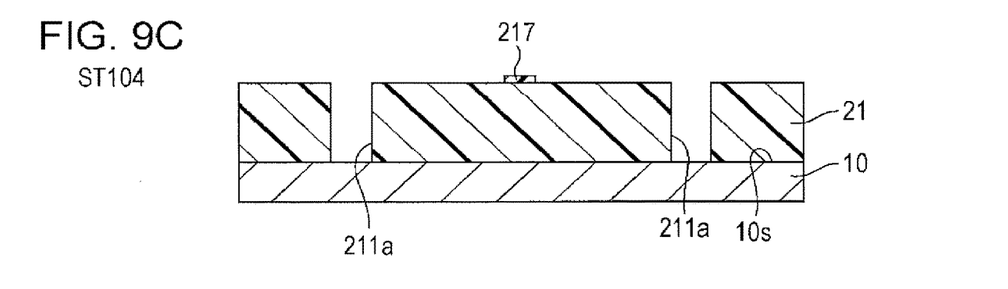
Figure 9D:
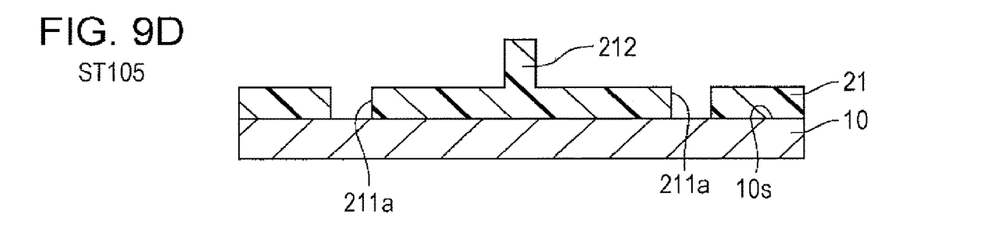

Subsequently, in an etching processing step, in step ST104 (hard mask forming step) illustrated in FIG. 9C, a hard mask 217 which is configured by an inorganic material such as silicon oxide ($SiO_2$) is formed on a surface of the photosensitive resin layer 210 at a side opposite to the substrate 1. More specifically, after an inorganic film such as a silicon oxide film ($SiO_2$) is formed through a PEVCD method or the like, the inorganic film is patterned in a state in which a resist mask is formed on a surface (surface at a side opposite to the wafer 10) of the inorganic film, and thereby the hard mask 217 is formed. Subsequently, in step ST105 illustrated in FIG. 9D, the photosensitive resin layer 210 is half-etched, the photosensitive resin layer 210 is partially thin, and the columnar convex portion 212 which protrudes toward a side opposite to the substrate 1 is formed (refer to FIG. 10B).

The steps ST102, ST103, ST104, and ST105 make the first sacrificial layer forming step through which the first sacrificial layer 21 including the opening (first opening) 211a for a hinge support post and the columnar convex portion 212 is formed by the exposure and development processing and the etching processing.

Thereafter, if the steps described with reference to FIG. 5E, FIGS. 6A to 6C, and FIGS. 7A to 7D are performed, the electro-optical device 100 can be obtained.

Improvement Example of Mirror Support Post (Second Support Post) 38

Figure 11:
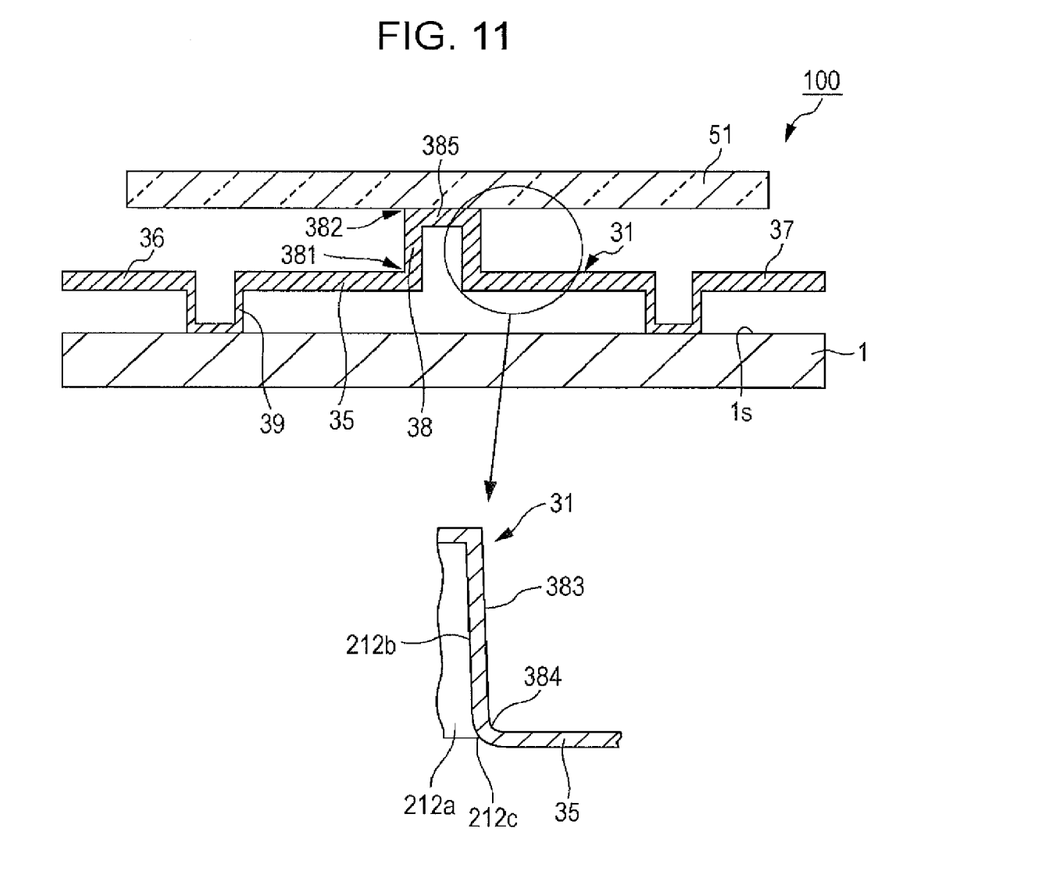
FIG. 11 is an explanatory view illustrating a desirable shape of a second support post (mirror support post) of the electro-optical device which employs an embodiment of the invention.

FIG. 11 is an explanatory view illustrating a desirable shape of the mirror support post (second support post) 38 of the electro-optical device 100 which employs an embodiment of the invention. When the electro-optical device 100 which employs an embodiment of the invention is manufactured and the first sacrificial layer 21 is formed, the positive-type photosensitive resin layer is used, but a negative-type photosensitive resin layer may be used. If the negative-type photosensitive resin layer is used, an outer peripheral surface 212b of the convex portion 212 easily becomes a tapered surface facing the mirror 51 side (a side opposite to the wafer 10) under the influence of scattering or the like of light within the photosensitive resin layer, when the convex portion 212 is formed as illustrated in FIG. 5B. As a result, an outer peripheral surface 383 of the mirror support post 38 becomes a tapered surface facing the mirror 51 side (a side opposite to the wafer 10). Therefore, since the torsion hinge (twist hinge) 35 side has a larger diameter than the mirror 51 side, the mirror support post 38 can increase strength of the mirror support post 38.

In addition, if a photosensitive resin layer is used, a base of the convex portion 212 easily becomes a curved shape, regardless of a positive type or a negative type. Particularly, when etching is performed in steps ST104 and ST105 illustrated in FIGS. 9C and 9D, a base 212c of the convex portion 212 easily becomes a curved shape. As a result, a curved sectional shape is formed between the mirror support post 38 and the torsion hinge 35. According to the configuration, there is an advantage in which stress being applied to the torsion hinge 35 from the mirror 51 through the mirror support post 38 is hardly concentrated on a specific position.

Another Embodiment

In the embodiment described above, planarization is performed such that the flat plate 385 remains in the second end portion 382 of the mirror support post 38 in the planarization step (step ST9) described with reference to FIG. 6B, but the planarization may be performed until the flat plate 385 is removed. Even in this case, when the second conductive film 50 for forming the mirror 51 is formed, an end portion of the mirror support post 38 is planarized by the convex portion 212 of the first sacrificial layer 21. Thus, a dent is not formed on the surface of the mirror 51.

What is claimed is:

1. A method of manufacturing an electro-optical device comprising:
    exposing and developing a photosensitive resin layer that is formed at a side of a substrate, etching the photosensitive resin layer in a state in which a hard mask that is configured by an inorganic material is formed, and forming a first sacrificial layer that includes a first opening and a columnar convex portion protruding toward a side opposite to the substrate;
    forming a first conductive film on a side of the first sacrificial layer opposite to the substrate and on an internal side of the first opening;
    patterning the first conductive film, and forming a first support post that is configured by the first conductive film formed on an internal side of the first opening, a torsion hinge that is formed as one piece together with the first support post, and a cylindrical second support post that protrudes toward a side opposite to the substrate from the torsion hinge and is formed as one piece together with the torsion hinge;
    forming a second sacrificial layer on the torsion hinge and a side of the second support post opposite to the substrate;
    planarizing the second sacrificial layer from a side opposite to the substrate to expose the second support post;
    forming a second conductive film on a side of the second sacrificial layer opposite to the substrate;
    forming a mirror by patterning the second conductive film; and
    removing the first sacrificial layer and the second sacrificial layer.

2. The method of manufacturing an electro-optical device according to claim 1, wherein in the forming of the first sacrificial layer, the photosensitive resin layer is exposed and developed to be partially thin to form the convex portion, and the photosensitive resin layer is etched to form the first opening.

3. The method of manufacturing an electro-optical device according to claim 2, wherein, in the exposing and developing, exposing is performed using a half tone mask.

4. The method of manufacturing an electro-optical device according to claim 1, wherein, in the forming of the first sacrificial layer, the photosensitive resin layer is exposed and developed to form the first opening, and the photosensitive resin layer is etched to be partially thin to form the convex portion.

5. The method of manufacturing an electro-optical device according to claim 1, wherein a positive-type photosensitive resin layer is used as the photosensitive resin layer.

6. The method of manufacturing an electro-optical device according to claim 1, wherein a negative-type photosensitive resin layer is used as the photosensitive resin layer.

* * * * *